US007860191B2

(12) United States Patent
Qi et al.

(10) Patent No.: US 7,860,191 B2
(45) Date of Patent: Dec. 28, 2010

(54) OPTIMAL TWO-LAYER COHERENT DEMODULATION FOR D-PSK (DIFFERENTIAL PHASE SHIFT KEYING)

(75) Inventors: Yihong Qi, Schaumburg, IL (US); Azzedine Touzni, Algonquin, IL (US)

(73) Assignee: QUALCOMM Incorporated, San Diego, CA (US)

( * ) Notice: Subject to any disclaimer, the term of this patent is extended or adjusted under 35 U.S.C. 154(b) by 542 days.

(21) Appl. No.: 11/851,753

(22) Filed: Sep. 7, 2007

(65) Prior Publication Data
US 2009/0067549 A1 Mar. 12, 2009

(51) Int. Cl.
*H03D 3/22* (2006.01)
*H04L 27/22* (2006.01)

(52) U.S. Cl. .................. 375/330; 375/316; 375/324; 375/340

(58) Field of Classification Search .............. 375/330, 375/340, 316, 324
See application file for complete search history.

(56) References Cited

U.S. PATENT DOCUMENTS

| 6,084,926 A * | 7/2000 | Zak et al. ............... 375/341 |
| 6,359,935 B1 * | 3/2002 | Hui et al. ............... 375/262 |
| 6,567,481 B1 * | 5/2003 | Molnar .................. 375/341 |

FOREIGN PATENT DOCUMENTS

DE 19540652 5/1996

OTHER PUBLICATIONS

D. Divsalar and M. Simon. "Multiple-symbol differential detection of MPSK," IEEE Trans. Communication, vol. 38, No. 3, Mar. 1990, pp. 300-308.
P. C. Wong and P.T. Mathiopoulos. "Nonredundant error correction analysis and evaluation of differential detected pi/4-shift DQPSK systems in a combined CCI and AWGN environments," IEEE Trans. Vehicular Technology, vol. 41, No. 1, Feb. 1992, pp. 35-48.
T.C. Hewavithana and M. Brookes. "Soft decisions for DQPSK demodulation for the Viterbi decoding of the convolutional codes," Proceedings of 2003 International Conference on Acoustic, Speech and Signal Processing, pp. IV-17-IV-20.
International Search Report and Written Opinion - PCT/US2008/009160, International Search Authority - European Patent Office - Feb. 27, 2009.
Rohling H. et al: "Comparison of PSK and DPSK modulation in a coded OFDM system" IEEE 47th Vehicular Technology Conference, vol. 2, May 4-7, 1997, pp. 870-874, XP010228967 NY, USA ISBN: 978-0-7803-3659-9 abstract Sections I-V figure 2.
Yadin Y. et al: "Multichip Differential Phase-Shift-Keyed Transmission Over (Non)Linear Optical Channels" Journal of Lightwave Technology, vol. 25, No. 6, Jun. 1, 2007, pp. 1431-1440, XP011185304 IEEE Service Center, New York, NY, US ISSN: 0733-8724 abstract Sections 1-VIII figure 3.

* cited by examiner

*Primary Examiner*—Ted M Wang
(74) *Attorney, Agent, or Firm*—Jeffrey Jacobs

(57) ABSTRACT

A D-PSK demodulator utilizes a two-layer coherent approach to estimate the phase shift of adjacent symbols. There is generated a probability set of each received symbol being one of possible constellation values. There is also generated a probability set of each of possible phase difference between two adjacent symbols. This probability set is then converted into soft bit information according to specific mathematical operation.

16 Claims, 3 Drawing Sheets

OPTIMAL TWO-LAYER COHERENT DEMODULATION FOR D-PSK (DIFFERENTIAL PHASE SHIFT KEYING)

BACKGROUND

The invention generally relates to Differential Phase Shift Keying (D-PSK) demodulation techniques.

D-PSK modulation is a popular modulation techniques used in modern wireless communication. One conventional D-PSK demodulation arrangement utilizes a differential/correlation technique applied to two adjacent symbols received from a communication channel. This is referred to as a "non-coherent" technique. Such a D-PSK technique is optimal based on the assumption that two adjacent received symbols are subject to a same unknown phase rotation in a propagation channel. However, in an Additive White Gaussian Noise (AWGN) or a static channel or any case where channel estimation is available, the conventional D-PSK technique does not take advantage of known channel information, and thus, does not provide optimal performance. Based on the basic non-coherent/correlation approach, several variations have been proposed by assuming different channel characteristics and exploiting different optimization criterions. Such proposals are described in the following literature: D. Divsalar and M. Simon, "Multiple-symbol differential detection of MPSK," IEEE Trans. Communication, vol. 38, no. 3, March 1990, pp. 300-308; P. C. Wong and P. T. Mathiopoulos, "Non-redundant error correction analysis and evaluation of differential detected pi/4-shift DQPSK systems in a combined CCI and AWGN environment," IEEE Trans. Vehicular Technology, vol. 41, no. 1 February 1992, pp. 35-48; T. C. Hewavithana and M. Brookes, "Soft decisions for DQPSK demodulation for the Viterbi decoding of the convolutional codes," Proceedings of 2003 International Conference on Acoustic, Speech and Signal Processing, pp. IV-17-IV-20.

"Phase-shift keying" (PSK) refers to all modulation formats in which the phase of a carrier is modulated. When the carrier is modulated with two distinct phases the modulation scheme is referred to as "binary PSK". When the carrier is modulated with four distinct phases the modulation scheme is referred to as "Quadratic PSK" (QPSK). PSK formats are widely used in wireless communication, networking, 802.11, WLAN, RFID, 802.15 Bluetooth, etc. PSK and D-PSK differ in the manner of encoding/decoding on the transmit/receive sides. D-PSK (Differential-PSK) modulation represents information bits by the phase shift of a symbol with respect to a previous symbol rather than with respect to an absolute reference. For D-QPSK, the phase shift between two adjacent symbols represents two bits.

Various D-PSK applications are described in the US patent literature. The following list is merely exemplary:

U.S. Pat. No. 4,035,767—Chin (Jul. 12, 1977);
U.S. Pat. No. 4,696,056—Morita (Sep. 22, 1987);
U.S. Pat. No. 5,193,223—Walczak (Mar. 9, 1993);
U.S. Pat. No. 5,528,631—Hayashi (Jun. 18, 1996);
U.S. Pat. No. 5,202,643—Sato (Apr. 13, 1993);
U.S. Pat. No. 5,363,410—Hayashi (Nov. 8, 1994);
U.S. Pat. No. 5,379,323—Nakaya (Jan. 3, 1995);
U.S. Pat. No. 5,369,378—Iinuma (Nov. 29, 1994);
U.S. Pat. No. 5,550,506—Tsumura (Aug. 27, 1996);
U.S. Pat. No. 5,550,868—Boccuzzi (Aug. 27, 1996);
U.S. Pat. No. 5,814,816—Nadolink (Sep. 29, 1998);
U.S. Pat. No. 5,446,422—Mattila (Aug. 29, 1995);
U.S. Pat. No. 5,369,378—Kosaka (Nov. 29, 1994);
U.S. Pat. No. 5,438,592—Boccuzzi (Aug. 1, 1995);
U.S. Pat. No. 6,097,768—Janesch (Aug. 1, 2000).

SUMMARY

The invention described and/or claimed herein provides a novel approach to D-PSK demodulation. Since there are no ideal communication channels, received symbols are somewhat deviated from their respective ideal locations on standard D-PSK constellations. Actual positions are deviated because symbols are distorted by noise in the communication channel. In a typical D-PSK demodulator, the phase difference of two adjacent received symbols is estimated by correlation of these two symbols, which is usually referred to as a non-coherent technique. The estimated phase difference is then used to determine its corresponding data bits according to some known modulation mapping table.

In contrast, the approach taken in this invention relies on a two-layer coherent detection to identify each symbol and to evaluate the probabilities of the phase difference of adjacent symbols being some possible predetermined values. In coherent detection, a received symbol is identified based on how close it is in distance from each of the ideal constellation symbols for the applicable constellation. This results in a coherent D-PSK demodulation. Thus, the invention herein described represents a different type of algorithm for identifying and interpreting received symbols.

According to the invention, there is first calculated, using a first received symbol which is subject to e.g., Additive White Gaussian Noise (AWGN) distortion, a probability set indicating a probability that the first received symbol corresponds to each of the possible values on its appropriate constellation (for example, in a Differential Quadratic Phase Shift Key (DQPSK) system, there are, four possible values for each symbol). Second, there is calculated for a second symbol (next received symbol) which is subject to noise distortion, a probability set indicating a probability that the second received symbol corresponds to each of the possible values on its appropriate constellation. Using the two sets of probabilities (one for each of the adjacent symbols), a probability is determined as to whether a phase difference between the first and second symbols matches each of the possible phase differences set forth in the applicable D-PSK modulation table. Then the probabilities of phase difference are used to interpret soft bit information, i.e. indicating the probability of a bit being "0" or "1".

The D-PSK demodulation approach described herein significantly improves demodulation performance. As an example, this improvement is in the range of 1~3 dB for a typical SNR (Signal to Noise Ratio) compared with the conventional DQPSK demodulation method. In addition, the approach described herein outputs more accurate soft bit information (probability of whether a bit is "0" or "1"). The accuracy of such information is important to guarantee good performance of a concatenated error-correction decoder which is a typical design in a modern wireless communication system.

An advantage of the D-PSK demodulation approach described herein is that it requires low computation complexity. Thus, it is easy and inexpensive to implement in an existing system.

Additional features and advantages of the invention will be set forth in the description that follows, and in part will be apparent from the description, or may be learned by practice of the invention. The advantages of the invention will be realized and attained by the structure and particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

For the sake of explanation, the accompanying drawings illustrate the present invention using as an example a particular type of D-PSK known as D-QPSK (Differential Quadratic Phase Shift Keying) which has four possible values for each symbol. The example, together with additional description, explains the principles of the invention and to enable one skilled in the pertinent art to make and use the invention. It is understood that the inventions are applicable to a general D-PSK system.

FIG. 1 is a block diagram illustrating the environment in which the inventions are utilized.

FIGS. 2a and 2b graphically represent the two constellations of symbols for an example DQPSK modulation.

DETAILED DESCRIPTION

For ease of explanation, the invention is illustrated by using as an example a particular type of D-PSK known as D-QPSK (Differential-Quadratic Phase Shift Keying) which has four possible values for each symbol. However, it should be understood that the invention is applicable to a general D-PSK system.

Figure 1:
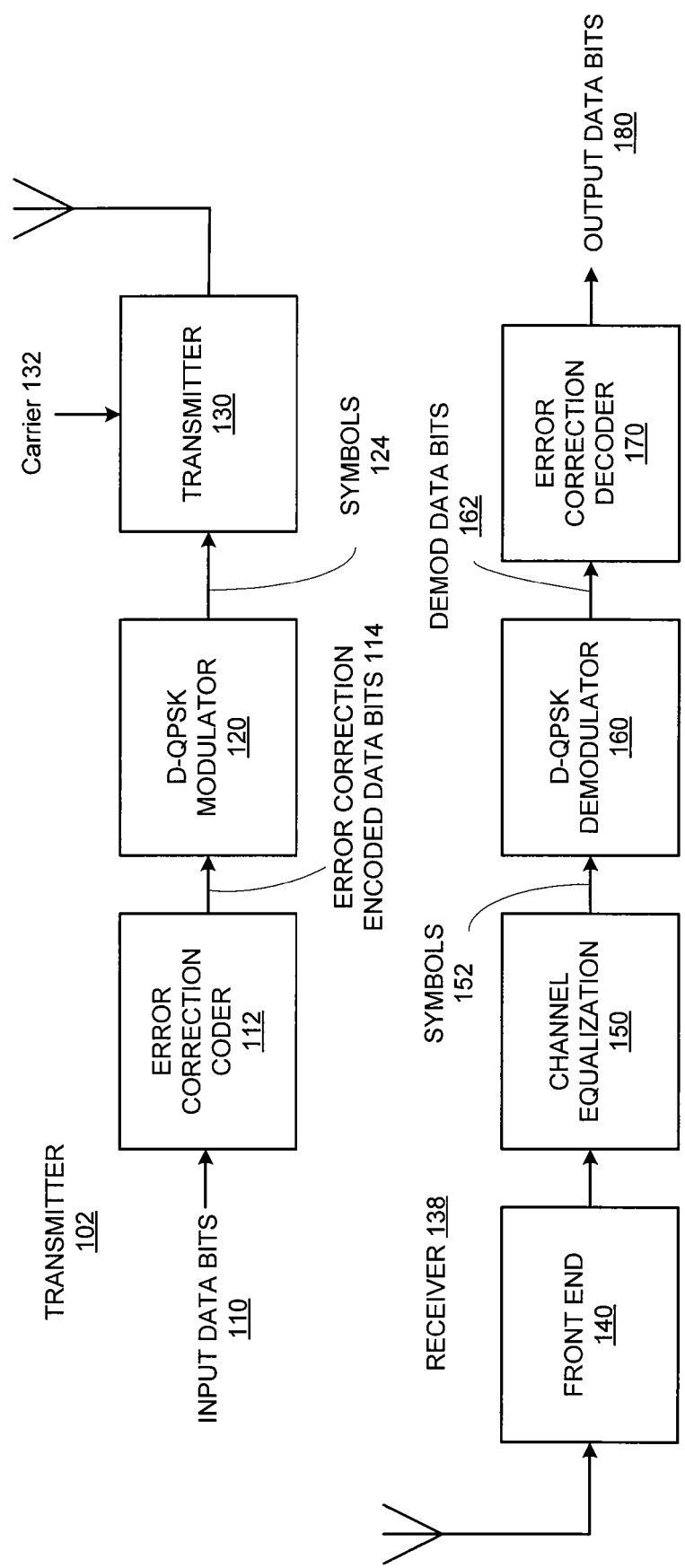

FIG. 1 is a block diagram illustrating the environment in which the invention is utilized. The invention is directed to a D-QPSK demodulator, generally shown in FIG. 1 by reference number 160. Generally, for enabling D-PSK modulation, a transmitter 102 receives input data bits 110 from some source. An error correction coder 112 encodes the data bits 110 by adding redundancy bits according to a specific algorithm. Error correction encoded data bits 114 are then coupled to an input of a D-QPSK modulator 120. D-QPSK modulator 120 converts input binary data bits into a stream of symbols 124. The phase difference between two adjacent symbols is specified as in Table 1. Symbols 124 are usually indicated on two constellations as shown in FIG. 2.

Each pair of successive input data bits 114 is interpreted as a phase shift from one symbol to the next in accordance with Table 1 below, which is an example of a DQPSK modulation table.

TABLE 1

| Input bits (b0, b1) | Output phase difference |
|---|---|
| 0, 0 | $\pi/4$ |
| 0, 1 | $-\pi/4$ |
| 1, 0 | $3\pi/4$ |
| 1, 1 | $-3\pi/4$ |

Once symbols 124 have been generated, they are modulated on a carrier 132 and transmitted by a transmitter 130. A receiver 138 receives a signal modulated by symbols 124 at its front end 140. Typically, a receiver will include channel equalization 150 which removes channel distortion from received signals and outputs received symbols 152. It is the function of a D-QPSK demodulator 160 to interpret symbols 152 as data bits. After error correction decoding at 170, which performs the inverse function of error correction coder 112 in the transmitter, output data bits 180 should be identical to input data bits 110.

The invention relates to D-QPSK demodulator 160. D-QPSK demodulator 160 receives output symbols from channel equalizer 150, and interprets phase differences between adjacent symbols as soft bit information, i.e., the probability of a bit being "1" or "0", based on Table 1, which is to be described in detail below.

For simplicity, consider two adjacent symbols in an AWGN channel. The approach taken in the invention is also applicable to any case where channel information is available. Because the communication channel is subject to noise distortion, received symbols do not precisely match with the ideal location of symbols on the D-QPSK constellations shown in FIG. 2a and FIG. 2b. Suppose the first symbol takes one of the four values ($e^{j\pi/4}$, $e^{j\cdot 3\pi/4}$, $e^{-j\cdot 3\pi/4}$, $e^{-j\pi/4}$), shown in FIG. 2a. According to the four possible phase shifts specified in the D-QPSK modulation table (Table 1), the second symbol should be one of ($e^{j\pi/2}$, −1, $e^{-j\pi/2}$, 1), shown in FIG. 2b.

Figures 2A, 2B:
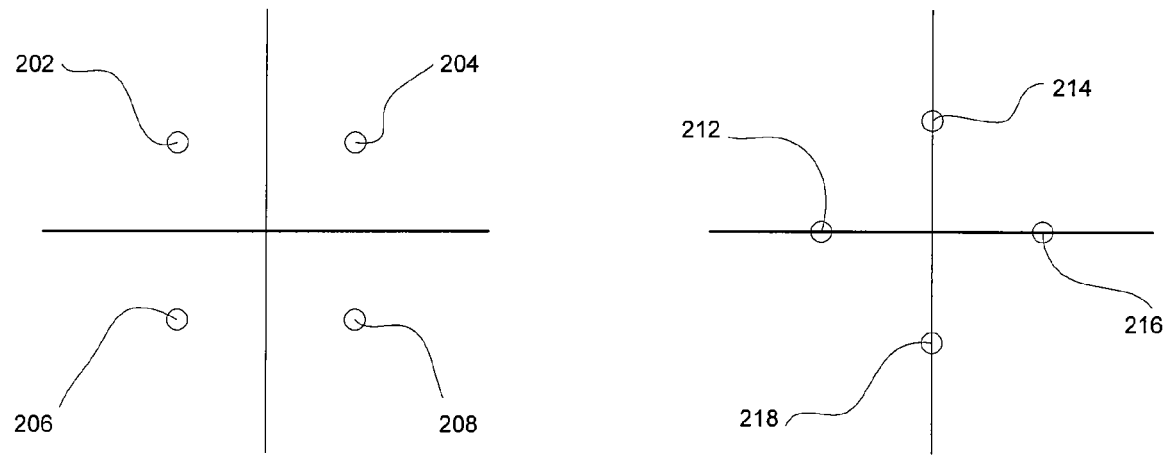

FIGS. 2a and 2b graphically represent the two constellations of symbols for DQPSK modulation, a species of D-PSK modulation. The first constellation shown in FIG. 2a includes symbols 202, 204, 206 and 208 in respective upper left, upper right, lower left and lower right quadrants of the constellation. The second constellation, shown in FIG. 2b, includes symbols 212, 214, 216 and 218.

At a transmitter, the phase shift of a symbol with respect to a previous symbol is set forth in a DQPSK modulation table shown in Table 1. For example, as shown in Table 1, to represent input bits "0,0", the phase of the next symbol should be shifted $\pi/4$ with respect to the phase of the previous symbol. In order to represent bits "0,1", the phase shift of the next symbol with respect to the previous symbol should be $-\pi/4$. In order to represent input bits "1,0", the next symbol should be phase shifted $3\pi/4$ with respect to the previous symbol. To represent input bits "1,1", the phase of the next symbol should be shifted $-3\pi/4$ with respect to the previous symbol.

Demodulator 160 examines the symbols, as received, and determines the phase difference from symbol to symbol in order to impute data bit meaning to those phase shifts. Thus, if a symbol is phase shifted $-\pi/4$ with respect to the immediately previous symbol, the data bits represented by that symbol should be "0,1". As another example, if a particular symbol has a phase shift with respect to its immediately previous symbol of $3\pi/4$, that symbol should represent bits "1,0".

In an ideal communication channel, with no noise present, a received symbol would be easily recognized as to its phase shift with respect to a previous symbol. However, ideal communication channels do not exist. Typically, a received symbol, even after channel equalization, will not fall precisely at one of the circles indicated on the constellations shown in FIGS. 2a and 2b. Rather, the received symbol will be somewhat distorted and therefore be plotted somewhat off from or distant from one of the ideally plotted symbols shown in the two constellations.

The demodulation arrangement provided by the present invention differs from the typical demodulation scheme described in particular in the manner in which a received symbol is identified and the phase difference of two adjacent symbols is determined. Rather than using a typical algorithm or set of calculations to identify phase differences, the invention uses a set of probability calculations that is explained in general with respect to FIG. 3.

Figure 3:
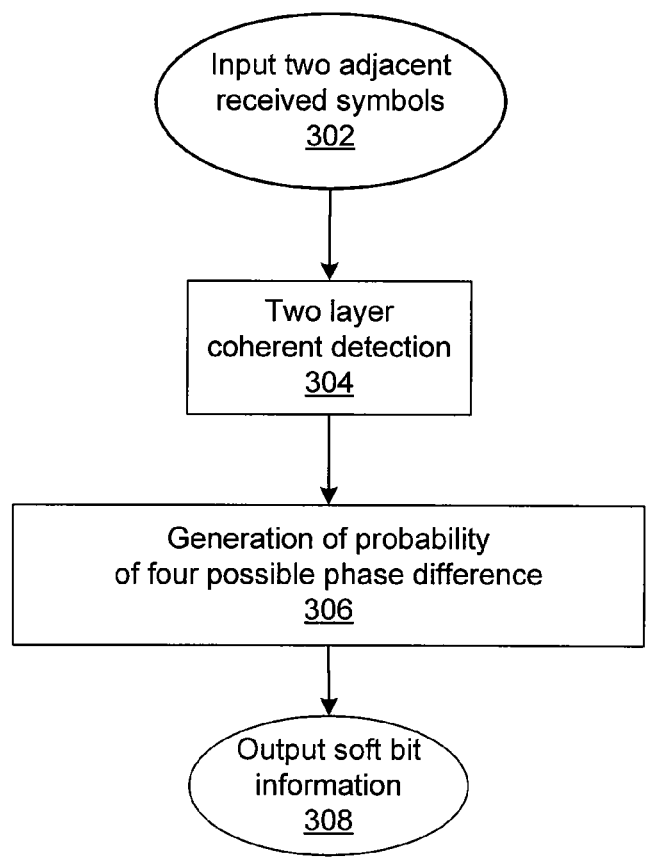
FIG. 3 is a flowchart of the optimal 2-layer coherent detection for DQPSK demodulation according to the inventions.

FIG. 3 is a flowchart of the optimal 2-layer coherent detection for D-QPSK demodulation according to the inventions. The example is based on D-QPSK for simplicity of explanation, but the invention is applicable to all forms of D-PSK.

At step 302 there is input two adjacent received symbols r1 and r2.

A two-layer coherent detection is carried out at step 304. This two-layer coherent detection assumes Gaussian noise. There is generated a probability of r1 being each of the constellation of symbols shown in FIG. 2a. These probabilities are denoted: P11, P12, P13 and P14. There is also generated a probability of r2 being one of the constellation of symbols shown in FIG. 2b. These probabilities are denoted: P21, P22, P23 and P24.

Thus, for the first received symbol r1 there is calculated four probabilities, i.e., that the received symbol corresponds to each of its four possible values shown in FIG. 2a, specifically, ($e^{j\cdot\pi/4}$, $e^{j\cdot3\pi/4}$, $e^{-j\cdot3\pi/4}$, $e^{-j\cdot\pi/4}$). Similarly, for the second received symbol r2, there is calculated four probabilities, i.e. that the received symbol corresponds to each of its four possible values shown in FIG. 2b, i.e. values of ($e^{j\cdot\pi/2}$, $-1$, $e^{-j\cdot\pi/2}$, 1).

At step 306, using the two sets of probabilities (one for the first symbol and one for the second symbol), a further calculation is performed to evaluate the probability of the phase difference between the first and second symbols being one of ($e^{j\cdot\pi/4}$, $e^{j\cdot3\pi/4}$, $e^{-j\cdot3\pi/4}$, $e^{-j\cdot\pi/4}$). For example, the probability for the phase difference being $\pi/4$ is calculated as $$F1 = P11P21 + P12P22 + P13P23 + P14P24 \quad (1)$$

Equation (1) means that the probability of the phase difference being $\pi/4$ is a function of four probabilities of the phase combination of the first and second symbols, i.e., the probability of the first symbol being $e^{j\cdot\pi/4}$ and second symbol being $e^{j\cdot\pi/2}$ (calculated as P11P21), the probability of the first symbol being $e^{j\cdot3\pi/4}$ and second symbol being $-1$ (calculated as P12P22), the probability of the first symbol being $e^{-j\cdot3\pi/4}$ and second symbol being $e^{-j\cdot\pi/2}$ (calculated as P13P23) and the probability of the first symbol being $e^{-j\cdot\pi/4}$ and second symbol being 1 (calculated as P14P24).

Similarly, the probabilities of the phase difference being $e^{j\cdot3\pi/4}$, $e^{-j\cdot3\pi/4}$, $e^{-j\cdot\pi/4}$, denoted by F2, F3 and F4, respectively, are evaluated as $$F2 = P11P22 + P12P23 + P13P24 + P14P21 \quad (2)$$

$$F3 = P11P23 + P12P24 + P13P21 + P14P22 \quad (3)$$

$$F4 = P1P24 + P12P21 + P13P22 + P14P23 \quad (4)$$

At step 308, the probability set corresponding to the phase difference between the first and second symbols, i.e., F1, F2, F3 and F4, is then converted to "soft" bit information, i.e. the probability of a bit being "0" or "1". Denoted two phase-difference-representing bits by "b0 b1", with "b0" and "b1" taking one of two values "0" or "1". Denote the probability of the bit "b0" being "0" by $P_{b0}(0)$. It is evaluated as $$P_{b0}(0) = \frac{F_1 + F_4}{F_1 + F_2 + F_3 + F_4} \quad (5)$$

Similarly, we obtain $$P_{b0}(1) = \frac{F_2 + F_3}{F_1 + F_2 + F_3 + F_4}, \quad (6)$$

$$P_{b1}(0) = \frac{F_1 + F_2}{F_1 + F_2 + F_3 + F_4}, \quad (7)$$

and $$P_{b1}(1) = \frac{F_3 + F_4}{F_1 + F_2 + F_3 + F_4}. \quad (8)$$

Thus, rather than conducting correlation between two adjacent symbols (i.e., non-coherent detection) as in a conventional method, the above-described process analyzes (1) the probability of two adjacent symbols being one of their ideal constellation symbols in their applicable constellations (i.e., two-layer coherent detection), (2) and based on the probability obtained in Step (1) the probability of particular phase differences between two adjacent symbols received via the same communication channel.

Figure 4:
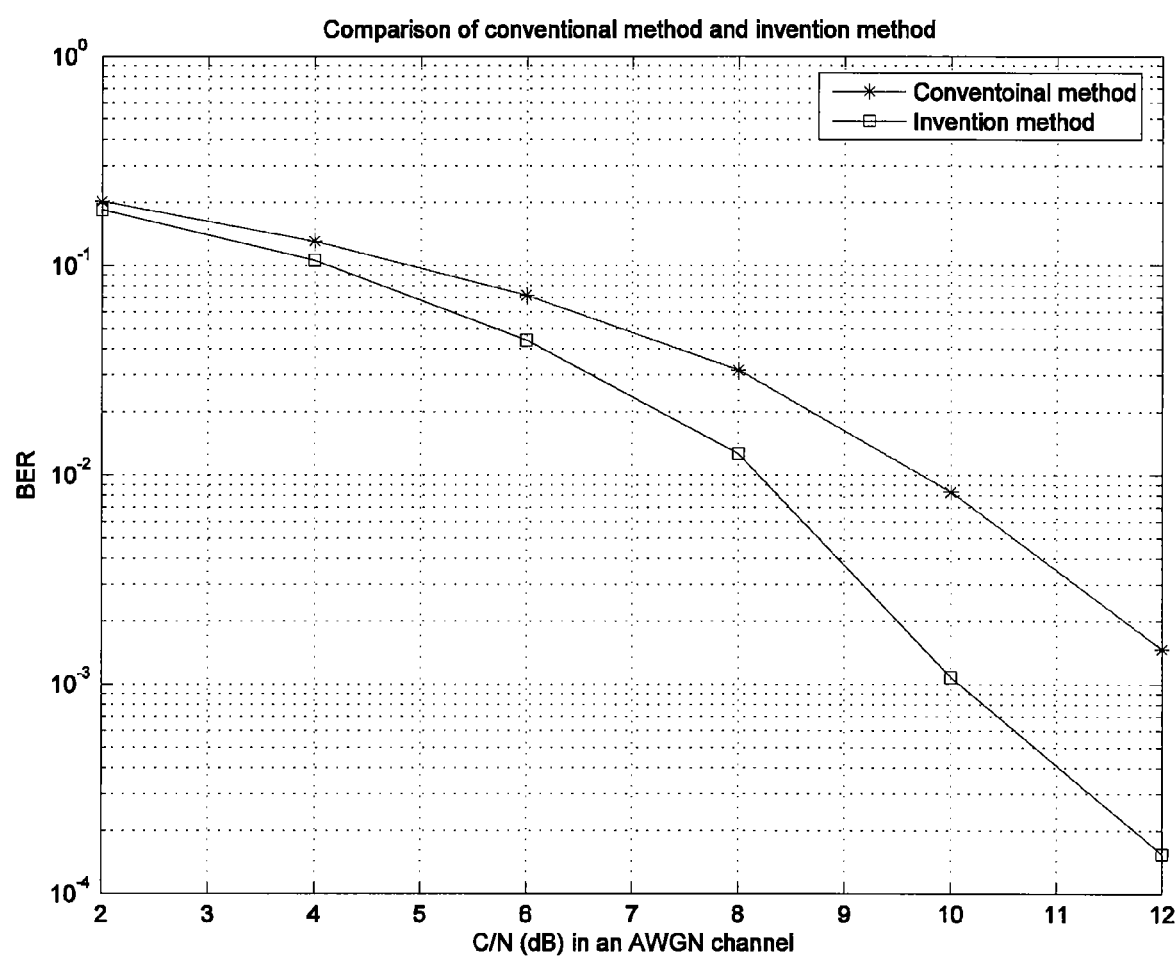
FIG. 4 is a graph comparing bit error rate (BER) of a conventional DQPSK method with the method according to the inventions.

FIG. 4 is a graphical representation of a performance comparison of the DQPSK example demodulation technique described herein with a conventional DQPSK demodulation technique. The technique described herein demonstrates significant performance improvement in Bit Error Rate (BER), specifically, 1~2 dB in the typical SNR (Signal to Noise Ratio) of interest.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A method for Differential Phase Shift Keying (DPSK) demodulation, comprising:
    receiving symbols from a communication channel;
    estimating the probability of each received symbol being one of its possible constellation values,
    evaluating the probability of the phase difference of two adjacent received symbols being one of possible phase differences according to a corresponding DPSK modulation table;
    evaluating soft bit information represented by the phase difference of two adjacent symbols based on a probability set representing probabilities of the phase difference being one of possible phase differences, or based on a probability set of phase difference being one of some possible phase differences having a probability greater than a selected probability.

2. A method according to claim 1 wherein the probability of each received symbol being one of all possible constellation values according to a corresponding DPSK modulation table is determined based on the statistic characteristics of noise in received symbols.

3. A method according to claim 1 wherein the probability of a phase difference of two adjacent received symbols being one of possible phase difference is determined based on the probability set of the two adjacent symbols being one of their possible constellation values or constellation values having a probability greater than a selected value.

4. A method according to claim 1 wherein the soft bit information represented by the phase difference of two adjacent symbols is calculated based on the probability set of the phase difference one of possible phase difference according to the corresponding DPSK modulation, or based on the probability set of phase difference being one of some possible phase differences having a probability greater than a selected value.

5. An apparatus for DPSK demodulating, comprising:
    a receiver constructed and arranged to receive symbols from a communication channel;

logic means for estimating the probability of each received symbol being one of its possible constellation values, logic means for evaluating the probability of the phase difference of two adjacent received symbols being one of possible phase differences according to a corresponding DPSK modulation table;

logic means for evaluating soft bit information represented by the phase difference of two adjacent symbols based on a probability set representing probabilities of the phase difference being one of possible phase differences, or based on a probability set of phase difference being one of some possible phase differences having a probability greater than a selected probability.

6. An apparatus according to claim 5 wherein the means for estimating probability comprises means for determining the probability of each received symbol being one of all possible constellation values according to a corresponding DPSK modulation table based on the statistic characteristics of noise in received symbols.

7. An apparatus according to claim 5 wherein the logic means for estimating probability includes means for determining the probability of a phase difference of two adjacent received symbols being one of possible phase difference is determined based on the probability set of the two adjacent symbols being one of their possible constellation values or constellation values having a probability greater than a selected value.

8. An apparatus according to claim 5 wherein the logic means for evaluating soft bit information comprises logic means for evaluating soft bit information based on the probability set of the phase difference one of possible phase difference according to the corresponding DPSK modulation, or based on the probability set of phase difference being one of some possible phase differences having a probability greater than a selected value.

9. A non-transitory computer readable medium having stored thereon instructions for Differential Phase Shift Keying (DPSK) demodulation that when executed in a processor cause the processor to perform:

receiving symbols from a communication channel;

estimating the probability of each received symbol being one of its possible constellation values, evaluating the probability of the phase difference of two adjacent received symbols being one of possible phase differences according to a corresponding DPSK modulation table;

evaluating soft bit information represented by the phase difference of two adjacent symbols based on a probability set representing probabilities of the phase difference being one of possible phase differences, or based on a probability set of phase difference being one of some possible phase differences having a probability greater than a selected probability.

10. A non-transitory computer readable medium according to claim 9 wherein the probability of each received symbol being one of all possible constellation values according to a corresponding DPSK modulation table is determined based on the statistic characteristics of noise in received symbols.

11. A non-transitory computer readable medium according to claim 9 wherein the probability of a phase difference of two adjacent received symbols being one of possible phase difference is determined based on the probability set of the two adjacent symbols being one of their possible constellation values or constellation values having a probability greater than a selected value.

12. A non-transitory computer readable medium according to claim 9 wherein the soft bit information represented by the phase difference of two adjacent symbols is calculated based on the probability set of the phase difference one of possible phase difference according to the corresponding DPSK modulation, or based on the probability set of phase difference being one of some possible phase differences having a probability greater than a selected value.

13. An apparatus for DPSK demodulating, comprising:

a receiver constructed and arranged to receive symbols from a communication channel;

estimating logic operative to estimate a probability of each received symbol being one of its possible constellation values, evaluating logic operative to evaluate the probability of the phase difference of two adjacent received symbols being one of possible phase differences according to a corresponding DPSK modulation table;

soft bit information logic operative to evaluate soft bit information represented by the phase difference of two adjacent symbols based on a probability set representing probabilities of the phase difference being one of possible phase differences, or based on a probability set of phase difference being one of some possible phase differences having a probability greater than a selected probability.

14. An apparatus according to claim 13 wherein the means for estimating probability comprises means for determining the probability of each received symbol being one of all possible constellation values according to a corresponding DPSK modulation table based on the statistic characteristics of noise in received symbols.

15. An apparatus according to claim 13 wherein the estimating logic includes phase difference logic that is operative to determine the probability of a phase difference of two adjacent received symbols being one of possible phase difference is determined based on the probability set of the two adjacent symbols being one of their possible constellation values or constellation values having a probability greater than a selected value.

16. An apparatus according to claim 13 wherein the logic means for evaluating soft bit information comprises logic means for evaluating soft bit information based on the probability set of the phase difference one of possible phase difference according to the corresponding DPSK modulation, or based on the probability set of phase difference being one of some possible phase differences having a probability greater than a selected value.

* * * * *